Figure 1:
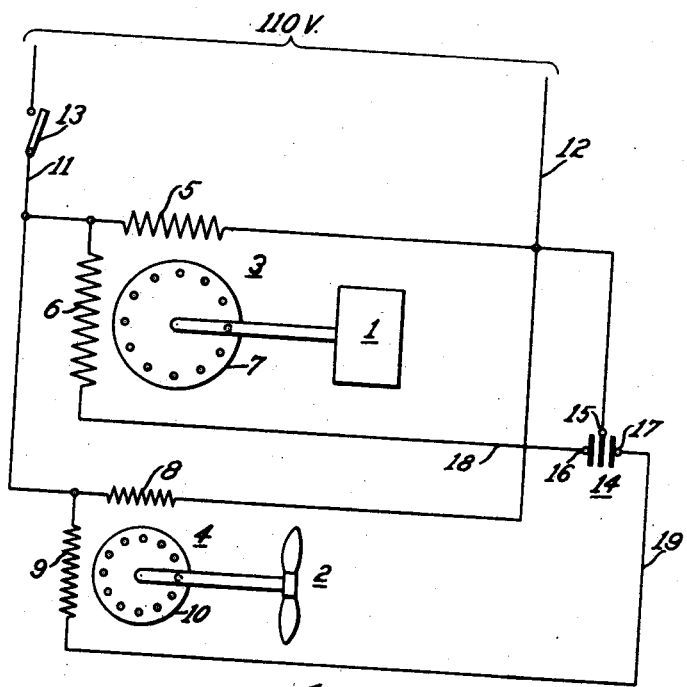

May 20, 1941.

L. C. PACKER 2,242,370

CAPACITOR-TYPE MOTOR FOR REFRIGERATING APPARATUS

Filed April 4, 1940

WITNESSES:

INVENTOR
Lewis C. Packer.
BY
ATTORNEY

UNITED STATES PATENT OFFICE 2,242,370

CAPACITOR-TYPE MOTOR FOR REFRIGERATING APPARATUS

Lewis C. Packer, Springfield, Mass., assignor to Westinghouse Electric & Manufacturing Company, East Pittsburgh, Pa., a corporation of Pennsylvania Application April 4, 1940, Serial No. 327,828

2 Claims. (Cl. 172—278)

My invention relates to two or more capacitor-motors which are operated from a single capacitor and from a common single-phase supply-line, and my invention has more particular relation to such motors which are utilized respectively as a compressor-motor and a fan-motor in an air-cooled refrigerating apparatus for either a refrigerator or an air-conditioning equipment. More particularly still, my invention has reference to such motors which are made in very large quantity-production, wherein small savings in cost are extremely important because of the large numbers involved. While my invention is not altogether limited thereto, it was primarily designed for the popular ¼ and ⅓ horse-power air-cooled compressor-units for domestic refrigerators and air-conditioning units.

Heretofore, in order to save expense, it has been customary to operate the compressor and fan motors in parallel from the same capacitor, that is, with the same capacitor connected in the capacitor-winding circuits of the respective motors. In the practical operation of any production-line, in quantity-production manufacture, to supply compressor and fan motors of the single-capacitor description, it is necessary, at times, to provide for changes in the compressor-motor performance, requiring adjustments in the electrical characteristics of the main or compressor-motor, so as to adapt it to different or changing load-conditions, such as different back-pressures against which the compressor must operate. In order to effect these changes in the performance-characteristics of the compressor-motor, without entirely redesigning the compressor-motor which would vitiate the advantages of quantity-production, it is necessary, at times, to change the value of the capacitor. For example, a recent change which was necessary because of changed performance-characteristics which were required of the compressor-motor, involved a change from a 32-microfarad capacitor to a 16-microfarad capacitor, which resulted in the auxiliary winding of the fan-motor taking too much capacity and getting too hot, when the compressor-motor was lightly loaded. This condition necessitated a change in the auxiliary winding of the fan-motor, in order to enable the fan-motor to operate satisfactorily on the changed value of capacitor, and this, in turn, has meant confusion in factory and service operations.

It is the object of my present invention to avoid the previously experienced difficulties and to provide a novel tapped-capacitor arrangement which saves the development of new fan-motors for each major change in the performance-characteristics of the compressor-motor, thereby simplifying both factory and service operations, with resultant economies.

Figure 2:
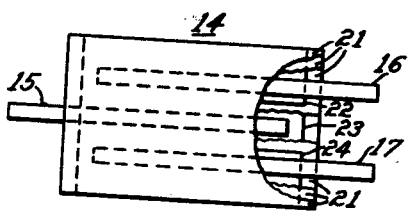

An exemplary form of embodiment of my invention is illustrated in the accompanying drawing, wherein Figure 1 is a diagrammatic view of circuits and apparatus illustrating a preferred form of embodiment, and Fig. 2 is a detailed view of the tapped capacitor, with parts broken away to illustrate the construction.

In Fig. 1, the refrigerating apparatus is diagrammatically indicated by means of a compressor 1 and a fan 2, which are the two parts of the refrigerating apparatus which must be driven by motors. The compressor-motor is indicated at 3, and the fan-motor is indicated at 4, both of these motors being self-starting single-phase induction motors of the capacitor type, the compressor-motor being the main motor and subject to varying loads, and the fan-motor being smaller and relatively constantly loaded. The compressor-motor 3 comprises a stationary primary member having a main winding 5 and a capacitor-winding 6, and it has a squirrel-cage induction-secondary rotor-member 7 which drives the compressor 1. The fan-motor 4 comprises a stationary or primary member having a main winding 8 and a capacitor-winding 9, and it also has a squirrel-cage rotor-member 10 which drives the fan 2 of the air-cooled refrigerating equipment.

The two motors 3 and 4 are energized from a single pair of single-phase supply-line conductors 11 and 12 through a control-switch 13.

In accordance with my invention, a single capacitor 14 is provided for the two motors 3 and 4, and this capacitor is provided with an intermediate tap 15 in addition to its two terminal members 16 and 17. One of the supply-line conductors 12 is connected to the intermediate tap 15 of the capacitor 14, and the two terminal members 16 and 17 of said capacitor are utilized to supply capacitor-current to two conductors 18 and 19, which are respectively connected to the capacitor-windings 6 and 9 of the respective motors 3 and 4, the other terminals of these capacitor-windings being connected to the other supply-line conductor 11. The main windings 5 and 8 of the two motors 3 and 4 are permanently connected across the two supply-conductors 11 and 12.

The modification required in the construction of the capacitor 14, in accordance with my invention, is shown, by way of example, in Fig. 2, which shows a wound type of capacitor comprising interleaved strips of paper 21, or other dielectric, and metal foils 22, 23 and 24, or other conductor-members or plates, with electrically conducting tabs or taps 16, 15 and 17 engaging the respective foils 22, 23 and 24. In the illustrated capacitor, one of the foils 23 is continuous, extending throughout the entire capacitor, while the cooperating foil is separated into two portions 22 and 24 respectively, so that one end of the foil 23 is in capacitive relation to the foil 22, whereas the other end of the foil 23 is in capacitive relation to the foil 24. It is to be understood that this arrangement is merely illustrative, as other means for providing, in effect, two serially connected capacitors 15—16 and 15—17 may be utilized. By building a single capacitor 14, with an intermediate tap 15, I provide a more economical construction than two complete, independent capacitors, and I simplify the manufacturing and service operations by providing only the single capacitor 14, to which the conductors 12, 18 and 19 are to be connected.

I claim as my invention:

1. In combination, two capacitor motors, each having a main winding and a capacitor-winding, a single pair of single-phase supply-line conductors therefor, and a single capacitor therefor, characterized by the capacitor having an intermediate tap as well as two terminal members, one of the supply-line conductors being connected to the intermediate tap, and the two terminal members being connected to the other supply-line conductor in series with the respective capacitor-windings of the two motors.

2. In a refrigerating apparatus, a varying load, a relatively small-power constant load, a motor for driving the first load, a smaller motor for driving the second load, each of said motors having a main winding and a capacitor-winding, a single pair of single-phase supply-line conductors for all four windings of the two motors, and a single capacitor for the two capacitor-windings of the two motors, characterized by the capacitor having an intermediate tap as well as two terminal members, one of the supply-line conductors being connected to the intermediate tap, and the two terminal members being connected to the other supply-line conductor in series with the respective capacitor-windings of the two motors.

LEWIS C. PACKER.